United States Patent [19]
Yeung et al.

[11] Patent Number: 4,984,857
[45] Date of Patent: Jan. 15, 1991

[54] LINEARIZATION OF SCAN VELOCITY OF RESONANT VIBRATING-MIRROR BEAM DEFLECTORS

[75] Inventors: Edward S. Yeung, Ames, Iowa; Shun-Le Chen, Long Island City, N.Y.

[73] Assignee: Iowa State University Research Foundation, Inc., Ames, Iowa

[21] Appl. No.: 297,483

[22] Filed: Jan. 17, 1989

[51] Int. Cl.$^5$ .................. G02B 26/10; G02B 5/10
[52] U.S. Cl. ..................... 350/6.6; 350/630; 350/320
[58] Field of Search .............. 350/6.5, 6.6, 6.7, 6.8, 350/6.9, 6.91, 320, 630; 358/208, 293, 494; 346/108, 109

[56] References Cited

U.S. PATENT DOCUMENTS

| | | | |
|---|---|---|---|
| 3,238,470 | 3/1966 | Mooney | 350/630 |
| 3,961,838 | 6/1976 | Zanoni | 350/7 |
| 4,037,231 | 7/1977 | Broyles et al. | 346/108 |
| 4,084,182 | 4/1978 | Maiman | 358/62 |
| 4,155,620 | 5/1979 | Rawson | 350/6.6 |
| 4,213,146 | 7/1980 | Maiman | 358/63 |
| 4,264,119 | 4/1981 | Minoura et al. | 350/6.6 |
| 4,368,488 | 1/1983 | Sakamoto | 358/208 |
| 4,638,370 | 1/1987 | Rosier et al. | 358/293 |

FOREIGN PATENT DOCUMENTS

| | | | |
|---|---|---|---|
| 0057823 | 5/1977 | Japan . | |
| 0057606 | 1/1982 | Japan . | |
| 58-72915 | 5/1983 | Japan | 350/6.8 |

Primary Examiner—Bruce Y. Arnold
Assistant Examiner—Loha Ben
Attorney, Agent, or Firm—Zarley McKee, Thomte, Voorhees & Sease

[57] ABSTRACT

A means and method for producing linerization of scan velocity of resonant vibrating-mirror beam deflectors in laser scanning system including presenting an elliptical convex surface to the scanning beam to reflect the scanning beam to the focal plane of the scanning line. The elliptical surface is shaped to produce linear velocity of the reflective scanning beam at the focal plane. Maximization of linerization is accomplished by considering sets of criteria for different scanning applications.

20 Claims, 3 Drawing Sheets

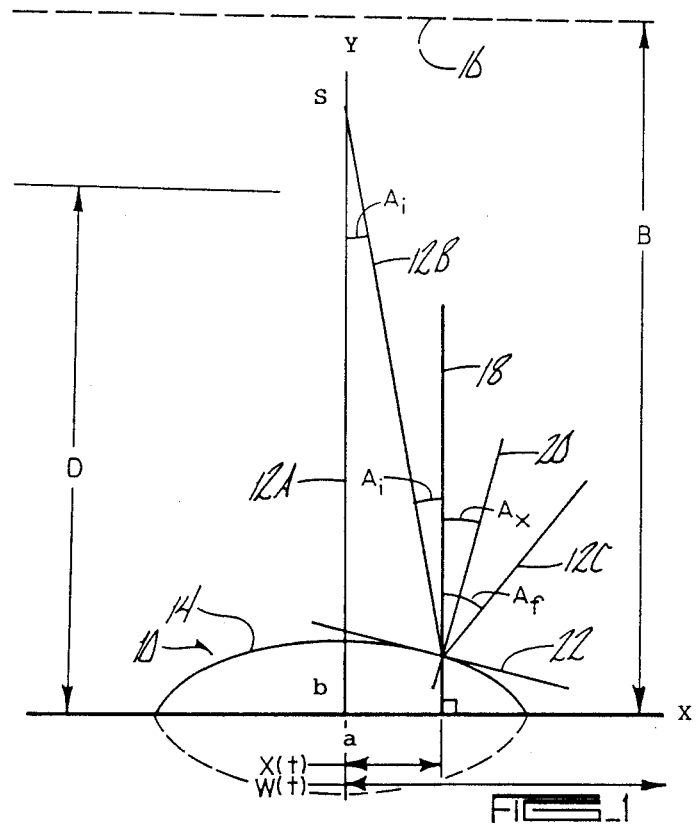
FIG_1
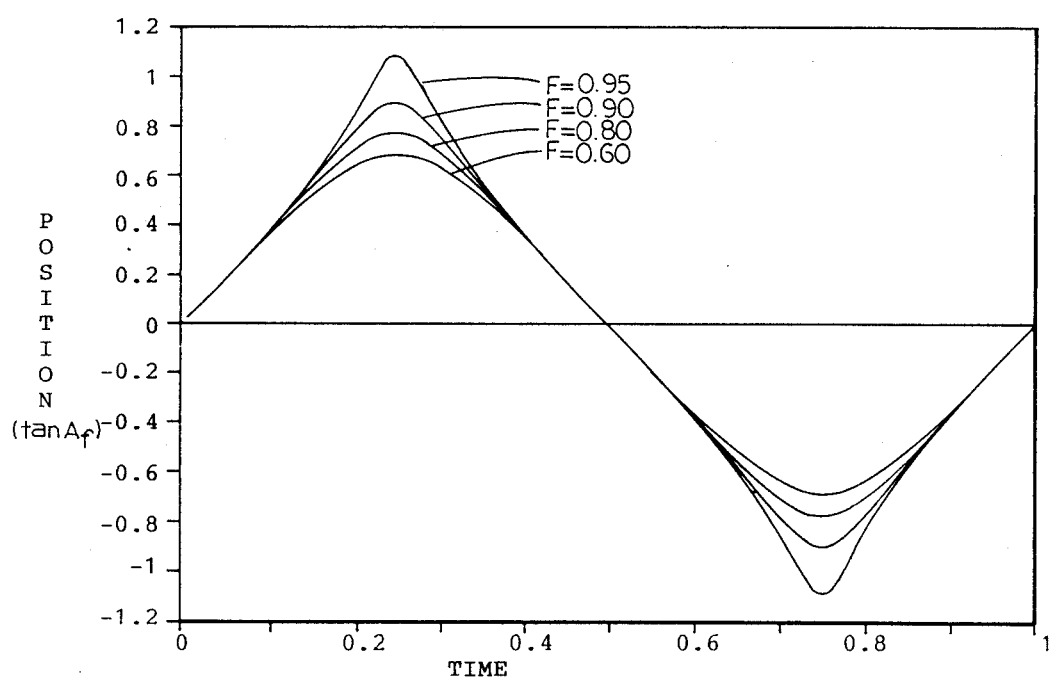
FIG_2

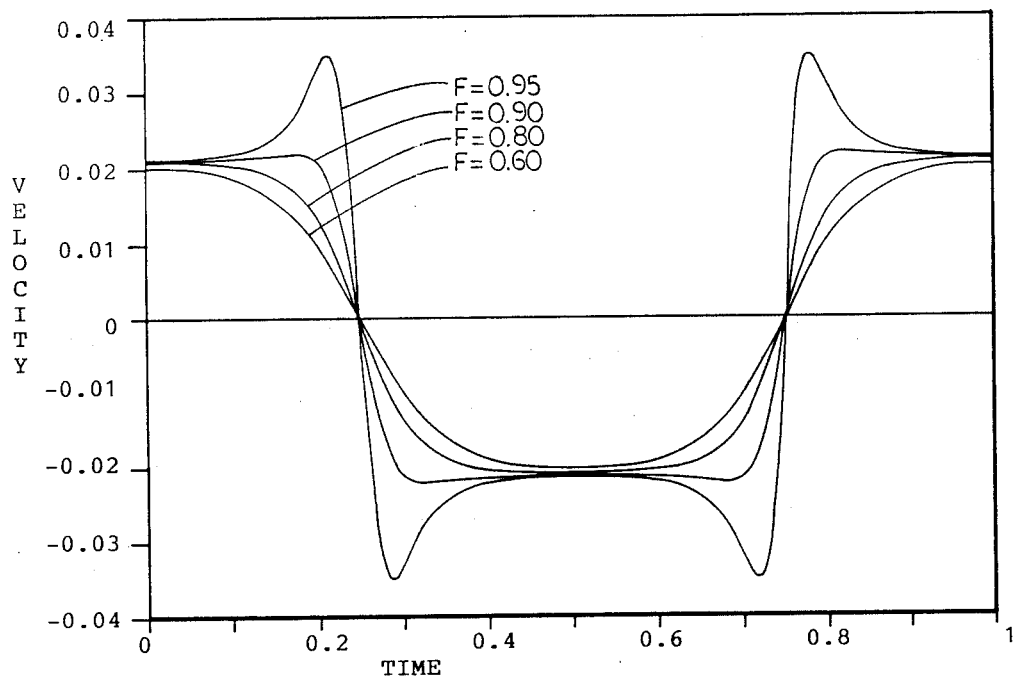
FIG_3
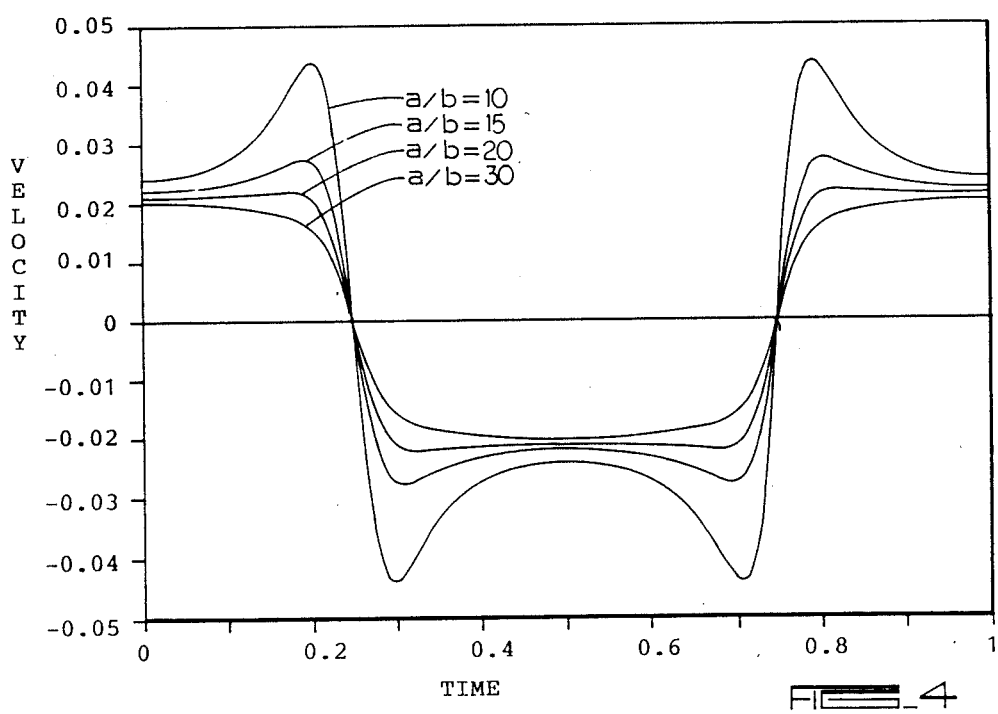
FIG_4

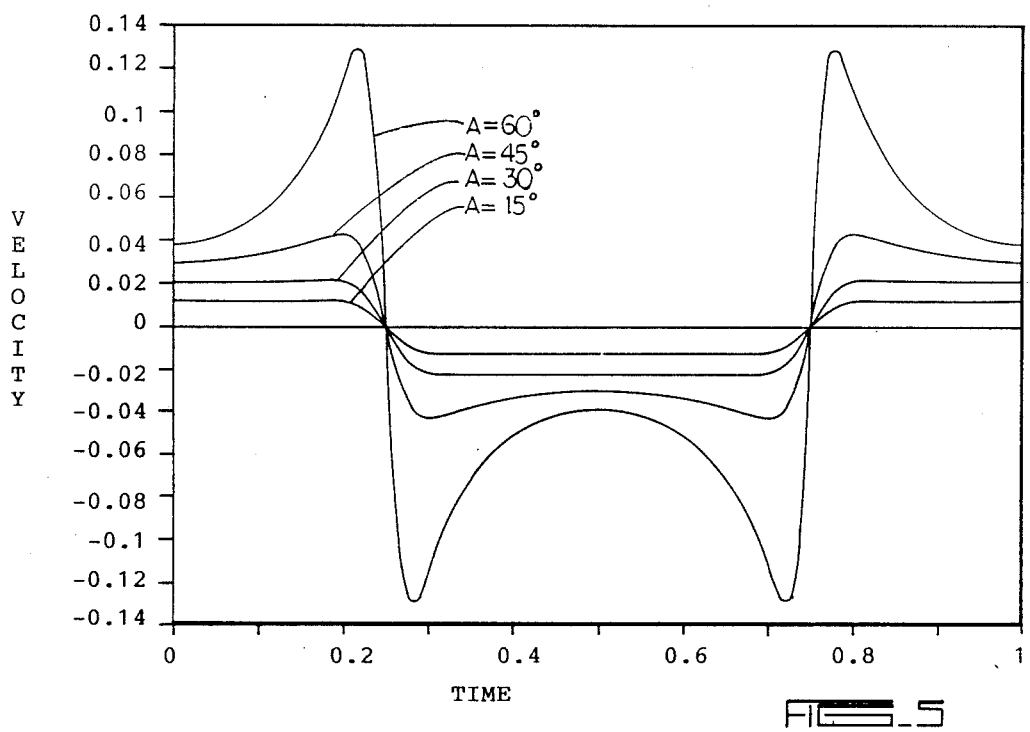
FIG_5
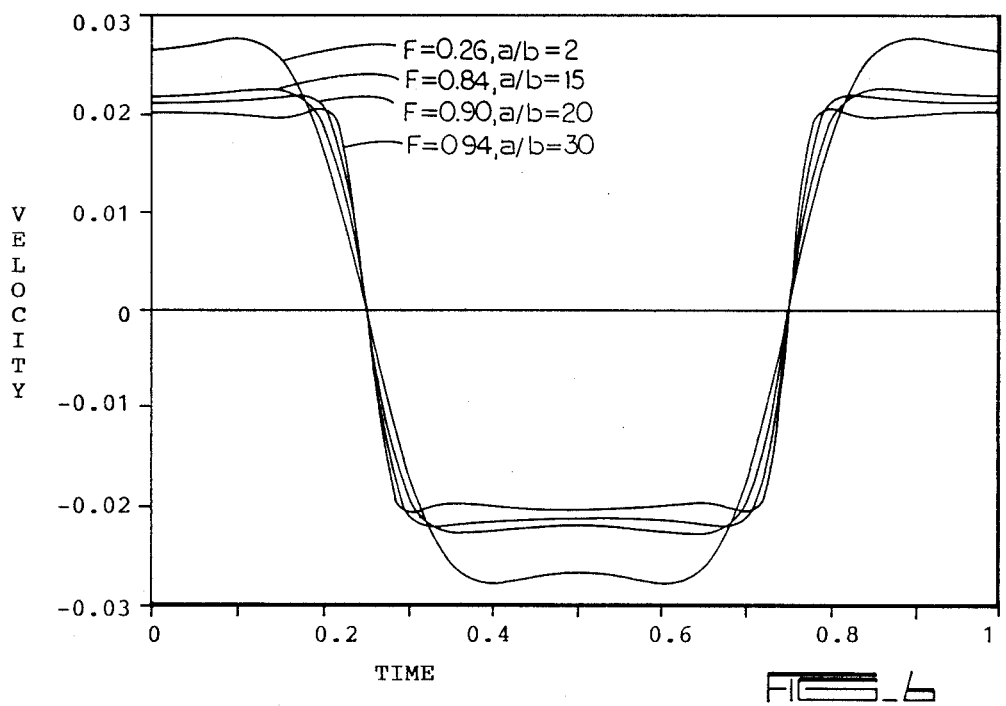
FIG_6

LINEARIZATION OF SCAN VELOCITY OF RESONANT VIBRATING-MIRROR BEAM DEFLECTORS

GOVERNMENT RIGHTS

This invention was made with government support under contract number W-7405-ENG-82 awarded by the Department of Energy. The Government has certain rights in the invention.

BACKGROUND OF THE INVENTION a. Field of the Invention

The present invention relates to laser scanning beam deflectors, and particularly, to a means and method for linearization of the scan velocity of resonant vibrating-mirror beam deflectors.

b. Problems in the Art

The development and utilization of laser scanning systems and apparatus have rapidly expanded, and continue to expand. Applications are diverse, for example such systems can be used in grocery store checkout lines and in highly sophisticated spacial imaging. Other examples are laser light shows, displays, information storage and retrieval, and high-quality printers.

A variety of different types of scanning systems have been developed. Most of them utilize some type of beam deflector to facilitate scanning of the beam. In turn, there are a variety of different types of analog or continuously variable beam deflectors which can be utilized. Five major types of analog beam deflectors are (1) electro-optical, (2) acousto-optical, (3) galvanometers, (4) polygon scanners, and (5) resonant vibrating mirrors. These types of analog beam deflectors are well known within the art.

Each of the above-mentioned types of analog beam deflectors has certain strengths and weaknesses. For deflection efficiency, reproducibility, and large angular scan range, the mechanical type deflectors are generally preferred.

As is known in the art, and as can be appreciated, mechanical deflectors deflect the scanning beam to cause an angular and varying reflection to achieve side-to-side scanning of the beam. As can be further appreciated, it is many times advantageous to have the beams scan continuously at a linear scanning velocity.

Some mechanical deflectors, such as the polygon scanners, can obtain a linear scan velocity over only a small angle at the focal plane. Resonant vibrating mirror deflectors, having a sine-like angular velocity, have linear scanning velocity deficiencies.

Presently, most attempts to obtain linear scanning velocity for resonant vibrating mirror deflectors consist of complicated timing circuits for the scanned data. This manipulation of the data is done after retrieval and requires costly equipment.

Additionally, there are certain applications where true linear scanning velocity is needed for accurate and valid results. One example is spatial imaging where integrated intensity must be constant over the scan region.

It is therefore a principal object of the present invention to provide a linearization of scan velocity of resonant vibrating-mirror beam deflectors which improves over or solves deficiencies and problems in the art.

It is another object of the present invention to eliminate the need for complicated and costly electronic timing circuitry to attempt to approximate linearization scan velocities into the acquired data.

A further object of the present invention is to provide a simple, inexpensive improvement to linearizing scan velocity which can be reliable and accurately used for a variety of applications.

A further object of the present invention is to provide true linearization of scan velocity during the scanning.

Another object of the present invention is to provide acceptable deflection efficiency, reproducibility, and angular scan range.

Another object of the present invention is to allow application of the scanning system to a variety of different uses, with conventional resonant beam deflector scanning apparatus.

Further object of the present invention is to provide essentially constant linear scanning velocity with minimal variation across the entire scanning range.

These and other objects, features, and advantages of the present invention will become more apparent with reference to the accompanying specification and claims.

SUMMARY OF THE INVENTION

The present invention includes a means and method of producing linearization of scan velocity of resonant vibrating-mirror beam deflectors and laser scanning systems. The invention is accomplished by positioning an optical means following the resonant vibrating mirror deflector for the scanning system. The optical means consists of an elliptical convex surface which serves as a reflecting mirror for the beam from the deflector. By selecting the appropriate parameters for the elliptical surface, along with factoring in parameters such as distance between the deflector and the surface, scanning angle desired, and the distance between the surface and the focal plane to be scanned, linearization can be optimized.

The invention is also advantageous in that it is not complex, can be manufactured and utilized efficiently and economically, and can be used with conventional scanning system equipment, including such things as correction optics (known in the art as f$\theta$ lense). Primarily, it eliminates the need for complex and expensive electrical timing circuitry, which cannot give true linear scan velocity anyway.

The invention includes the means to achieve these advantages, the method by which it is achieved, and the method by which a particular surface and positioning of this surface can be derived for optimal linearization.

BRIEF DESCRIPTION OF THE DRAWINGS

FIG. 1 is a schematic depiction of the elliptical surface according to the invention as operatively associated with a resonant vibrating mirror scanner.

FIG. 2 is a graphical depiction of scan position as a function of time showing optimization of linearization for various amounts of surface of the elliptical mirror according to the invention.

FIG. 3 is a graph charting scan velocity as a function of time where the parameters are those of FIG. 2.

FIG. 4 is a graph of scan velocity as a function of time for different configurations of the elliptical mirror.

FIG. 5 is a chart of scan velocity as a function of time for different maximum deflection angles for the beam.

FIG. 6 is a chart of scan velocity as a function of time for optimized values of elliptical surface utilized and definitions of the curvature of the elliptical surface.

DETAILED DESCRIPTION OF THE PREFERRED EMBODIMENT

The invention will now be described in detail with respect to a preferred embodiment. Particular reference should be taken to the drawings which will also be discussed. This description is to help in an understanding of the invention, but is not meant to limit its scope, which is defined solely by the claims which shall follow.

As previously mentioned, resonant vibrating-mirror beam deflectors for scanning systems are well known in the art, for example, such systems are disclosed in U.S. Pat. No. 4,037,231 to Broyles et al.; 4,213,146 and 4,084,182 to Maiman, all three of which are incorporated by reference hereto. Additionally, such type of scanning systems are discussed in J. Montager, "A Practical Approach to Low Inertia Scanner Selection", Proc. SPIE 84, 42 (1976), which is also incorporated by reference.

The resonant vibrating-mirror beam deflectors receive a laser beam, and angularly deflect it in a plane according to movement of the deflector. Resonant beam deflectors are simply mirrors which are oscillated to achieve this angular deflection. As can be understood, variations in the scanning velocity of the beam at its intended focal plane, can vary significantly, especially at the opposite extremes of deflectance where there is a reversal of scanning direction.

By referring to FIG. 1, it can be seen that the present invention contemplates using an external optical member 10 to reflect the scanning beam 12 from scanner S. In the schematical depiction in FIG. 1, scanning beam 12 can be described in three segments. Segment 12a represents the beam emanating from the beam source (not shown). Segment 12b represents the scanning beam after it has been reflected by resonant vibrating-mirror beam deflector contained within scanner S. Finally, Segment 12c depicts the scanning beam after it has reflected by optical member 10 and is directed towards its intended scanning plane or surface. Generally, this beam will be referred to as scanning beam 12, unless segment 12a, 12b, or 12c is specifically referred to.

FIG. 1 therefore generally shows that optical member 10 presents an elliptical surface 14 which reflects scanning beam 12 after emanating from scanner S. Elliptical surface 14 is produced and positioned so that linearization of the scanning velocity at the focal plane 16 is accomplished across the entire scanning range.

FIG. 1 also depicts the frame of reference by which the exact shape of elliptical surface 14, and the relative position of optical member 10 to the scanning beam 12 can be discussed. Optical member 10 is basically shown centered on the center of an eclipse having x and y axes with segment 12a of scanning beam 12 directed co-axially with the y axis.

Focal plane 16 is basically parallel to and in a positive y direction from the x axis. It is located at a distance B from the x axis.

To describe the function of optical member 10, certain other parameters must be defined. Additionally, it is pointed out that only the upper portion (elliptical surface 14 in solid lines) of optical member 10, that is a portion of optical member 10 extending above the x axis, is utilized. Therefore the lower part of optical member 10 is shown in dashed lines.

The distance between scanner S (more precisely, the deflecting mirror in scanner S) and the x axis is shown as D. Optical member 10, in presenting elliptical surface 14 to segment 12b of scanning beam 12, adjusts its scanning velocity, particularly at extreme opposite sides, to linearize that rate.

In FIG. 1, angle $A_i$ represents the angular deflection of segment 12b at any time t. Angle $A_f$ represents the angle between normal line 18 (which is parallel to the y axis and normal to the x axis) and segment 12c of scanning beam 12. Angle $A_x$ represents the angle between normal line 18 and normal line 20, which is perpendicular to tangent line 22 which is in turn tangent to the point on elliptical surface 14 at which scanning beam 12 is reflected. As can be seen, angle $A_i'$ is formed between normal 18 and segment 12b, being equal to angle $A_i$.

Therefore, as scanner S deflects scanning beam 12 during its oscillation, scanning beam 12 will reciprocate across elliptical surface 14 on either side of the y axis. Because of the inherent properties of elliptical surface 14, angle $A_f$ will increase the farther it moves towards either end of elliptical surface 14, and decrease the closer it gets to the y axis.

A resonant vibrating-mirror beam deflector has a sine-like behavior. It is known that the angular deflection $A_i$ of a typical resonant vibrating-mirror scanner at any time t can be expressed as:

$$A_i = A \sin(2\pi f t) \qquad (1)$$

where A is the maximum deflection angle and f is the frequency of vibration. Furthermore, linear displacement of segment 12b of scanning beam 12 at any time t is defined by the following equation:

$$x(t) = D \tan(A \sin 2\pi f t) \qquad (2)$$

where D represents the distance between scanner S and the x axis. This is a non-linear function.

Optical member 10 is inserted and positioned to intercept the scanning beam 12 and redeflect it.

The relationship between angle $A_f$ to angle $A_x$ is:

$$A_f = A_i + 2A_x \qquad (3)$$

It was deduced that to linearize the scanning velocity of scanning beam 12, tan $A_f$ would have to be a linear function. Because the final beam position in focal plane 16 is assumed to be parallel to the x axis and at a distance B from the x axis in the positive y direction, the following equation defines the position of the beam at any time t:

$$w(t) = x(t) + B \tan A_f \qquad (4)$$

By utilizing the optical member 10 with elliptical surface 14, it is known that surface 14 can be described as follows:

$$x^2/a^2 + y^2/b^2 = 1 \qquad (5)$$

Because in the visual applications of the preferred embodiment, minor axis b is much smaller than distance D, distance D can be considered as time independent. It was also discovered that if distance D is much smaller than distance B (distance to focal plane 16), x(t) can be neglected in equation 4.

Utilizing equation 3, it can be seen that:

$$\tan A_f = (\tan A_i + \tan 2A_x)/(1 - \tan A_i \tan 2A_x) \qquad (6)$$

Additionally, angle $A_x$ is simply given by the arctangent of the slope of the curve at that particular point, dy/dx. By differentiating equation 5, the following is obtained:

$$\tan A_x = [b^2/a^2 x(t)]/[b^2 - b^2/a^2 x^2(t)]^{\frac{1}{2}} \quad (7)$$

By utilizing these equations, elliptical surface 14 can be designed, along with its placement relative to scanner S and focal plane 16, to achieve linearization of scanning velocity. It is to be understood that equations 6 and 7 allow calculation of the loci of the scan beam for a given set of parameters. Those parameters include, again, the position of optical member 10 and elliptical surface 14 with respect to scanner S, the distance between scanner S and optical member 10, and the distance between focal plane 16 and optical member 10. Furthermore, it is to be understood that the present invention achieves linearity of scan of no more than plus or minus 2% deviation over the entire scan range. For purposes of discussion, the fraction of time during one cycle of vibration of a resonant vibrating-mirror beam deflector where $\tan A_f$ is linear with time is referred to as the linear scan range (lsr). An optimal system having complete linearity over the entire scan range would have an lsr = 1.0.

Another parameter to be factored into the design of optical member 10 is the fraction of elliptical surface 14 (F) that is used for scanning. This parameter determines the total change in curvature over the scan and is defined by:

$$F = (D \tan A)/a \quad (8)$$

It is therefore seen that F is more particularly the fraction of the long axis a of optical member 10 which is involved in scanning.

To further help in an understanding of the invention, FIGS. 2-6 graphically depict plotting of various parameters taken from the equations to verify the theoretical validity of the preceding discussion. It is helpful to briefly discuss these figures to aid in an understanding of the invention.

The results of FIGS. 2-6 were obtained utilizing an argon ion laser deflected by a commercial scanner (namely laser scanning products, Palatine, Ill., Model URS-10 with SRS 101 Driver). A brass elliptical mirror was utilized with a major axis a and minor axis b.

FIG. 2 depicts the results for different values of F (fraction of used surface of elliptical surface 14), for an elliptical optical member 10 having a major and minor axis ratio of a/b = 20, with scanner S having a maximum deflection angle A = 30°. The abscissa depicts arbitrary time whereas the ordinate depicts $\tan A_f$. By plotting $\tan A_f$ against time, the graph actually depicts position of the scan beam as a function of time. One cycle of scan corresponds to 1.0 unit on the abscissa.

As can be seen in FIG. 2, each one half scan is symmetrical to its predecessor. Each of the four curves as depicted, applies to F = 0.95, 0.90, 0.80, and 0.60 as indicated. Generally these results show that for each scan, a symmetrical sawtooth-like behavior of scan beam relative to time is created by using the optical member 10. Without it, this plot would be much more sinusoidal, and less linear.

In particular, FIG. 2 shows that for those four curves, the one representing F = 0.90 gives the widest linear scan range. The vast majority of positions of the beam, where F = 0.90, results in linearity of scan velocity.

FIG. 3 assists in this understanding by depicting the first derivative of the curves of FIG. 2. This effectively shows a plot of velocity of the beam over the scan. The positive and negative values of the curves represent the forward and reverse scans respectively. The horizontal portions of the curves indicate regions of constant velocity.

FIG. 3 clearly shows how the curve representing F = 0.90 has the best results for correcting nonlinear behavior defined by equation 2. It is to be understood that a specific analysis of values of the F = 0.90 curve between 0 and 0.206 along the abscissa results in less than a plus or minus 2% deviation from the mean value, which is well within the target of results for the invention. This means that the lsr = 0.206/0.25 = 0.82. This linear scanning range is clearly superior to curves F = 0.95, 0.80, and 0.60 where the lsr = 0.44, 0.49, and 0.35 respectively.

To achieve the optimal value for F for each application, vibrating mirror of scanner S must be placed at the optimal value of D according to equation 8.

FIG. 4, by comparison, shows affect on linearity based on actual construction of elliptical surface 14. In this graph, the maximum scan angle A = 30°, and the parameter F = 0.9 are utilized. As seen, the values for a/b for each of the four curves is shown. The best linearity is achieved for the value a/b = 20. It is to be understood that decreasing the value a/b from optimum is equivalent to increasing F from optimum. Both have the effect of introducing larger variation in curvature over the scan, exaggerating the discrepancy between the ellipse and a perfect linearization surface. On the other hand, if a/b increases or if F decreases, the scan surface does not have enough curvature to provide the needed correction.

FIG. 5 graphically depicts the effect of different maximum scanned angles A on linearity. For this plot, F = 0.90, a/b = 20, and the varying maximum scan angles are 60°, 45°, 30°, and 15° for the four curves. It can be seen that the larger the value of A, the more nonlinear x(t) in equation 2 becomes and correction is difficult. Thirty degrees is quite typical of scanner S and correction is adequate. Given A = 30°, one can optimize a/b and F simultaneously.

FIG. 6 depicts such optimization of F and a/b. One cycle of scan corresponds to 1.0 along the abscissa. For each of the values a/b = 2, 15, 20, and 30, the optimal values of F were found to be 0.26, 0.84, 0.90, and 0.94, respectively. For these optimal designs, it was found that lsr = 0.58, 0.71, 0.82, and 0.87, respectively. The last two results in particular offer excellent correction without restricting the scan length significantly.

It can therefore be seen that utilization of optical member 10, and optimizing the parameters for optical member 10 for particular applications, results in producing linearization of scanning velocity according to the invention. Some experimentation and testing are needed to arrive at optimal parameters. However, the present invention allows such optimization for all different sets of requirements and parameters.

It is to be understood that the present invention thus presents a non-complex, economical, straight forward means and method acceptably correcting nonlinearity of scanning velocities for resonant vibrating-mirror beam deflectors for scanning systems.

It is to be further understood that elliptical surface 14 of optical member 10 also acts to diverge the light beam, as it is a locally convex surface. A conventional $f\theta$ lens for focusing the beam at focal plane 16 must be modified to recollimate the final image if optical member 10 is utilized.

Furthermore, it is to be understood that the present invention can be easily manufactured. Derivation of optical member 10 can be obtained by as simple a method as cutting a cylinder at an angle and then performing appropriate machining and polishing.

The included preferred embodiment is given by way of example only, and not by way of limitation to the invention, which is solely described by the claims herein. Variations obvious to one skill in the art will be included within the invention defined by the claims.

What is claimed is:

1. A means for linearization of scan velocity of a resonant vibrating-mirror beam deflector where an energy beam is directed along a beam path to a deflector means including a resonating mirror having a rotational axis for deflecting a first reflected portion of the beam in a plane normal to the rotational axis for scanning the beam along a scan line, the improvement comprising:
   a beam path altering means positioned in the beam path following the resonating mirror for linearizing scan velocity in a focal plane, the altering means comprising an elliptical surface having a major and minor axis and being disposed in such a manner that the minor axis of the elliptical surface is coaxial with a line in normal alignment to the mirror, the elliptical surface being shaped to maximize the linearity between positions of a second reflected portion of the beam along the scan line in relationship to time.

2. The means for linearization of claim 1, wherein the shape of the elliptical surface is based on the following criteria:
   position of the altering means with respect to the mirror, position of the elliptical surface with respect to the mirror, distance between the focal plane and the altering means, the distance between the mirror and the altering means.

3. The means for linearization of claim 2, wherein the parameter defining the elliptical surface are determined by considering further the fraction of the elliptical surface involved in reflecting the first reflected portion of the beam.

4. The means for linerization of claim 2, wherein the shape of the elliptical surface is determined by considering the further factors of the ratio of the major axis to the minor axis of the elliptical surface.

5. The means for linearization of claim 2, wherein the shape of the elliptical surface is determined by further taking in consideration the maximum deflection angle required of the beam.

6. The means for linearization of claim 1, wherein the altering means comprises a member which is elliptical in cross-section and having an elliptical convex reflecting surface.

7. The means for linearization of claim 1, wherein the elliptical surface of the altering means is defined by a major axis greater in length than the scanning range across it.

8. The means for linearization of claim 1, wherein the minor axis of the elliptical surface is much smaller than the distance between the mirror and the major axis of the altering means.

9. The means for linearization of claim 1, wherein the distance between the mirror and the major axis of the elliptical surface is much smaller than the distance between the focal plane and the major axis of the elliptical surface.

10. The means for linearization of claim 1, wherein $$A_f 32 A_i 30 2A_x$$

where $A_f$ is the angle between the second reflected portion of the beam and a line normal to the major axis of the elliptical surface at a point of incidence of the first reflected portion of the beam onto the elliptical surface, $A_i$ is the angle between the first reflected portion of the beam and a line parallel to the minor axis of the elliptical surface at a point of reflection of the second reflected portion of the beam on the elliptical surface the point of incidence and reflection constituting the same point on the elliptical surface; and $A_x$ is the angle between the line parallel to the minor axis and the line normal to the elliptical surface at the point of incidence on the elliptical surface.

11. The means for linearization of claim 10, wherein $\tan A_f$ is a linear function.

12. The means of linearization of claim 11, wherein the following equation is utilized to define the elliptical surface for linearization of scan velocity $$\tan A_x = (b^2/a^2 x(t))/(b^2 31\ b^2/a^2 x^2(t)^{\frac{1}{2}})$$

where a equals, the length of the major axis and b equals the length of the minor axis of the elliptical surface of the altering means, and X(t) is the projected distance of the point of reflection of the second reflected portion of the beam onto an x-axis coincident with the major axis of the elliptical surface as a function of time.

13. The means for linearization of claim 12, wherein $$\tan A_f = (\tan A_i + \tan 2A_x)/(1 - \tan A_i \tan 2A_x).$$

14. The means for linearization of claim 1, further comprising an $f\theta$ lens utilized to recollimate the second reflected portion of the beam after reflection from the elliptical surface.

15. A method of linearization of scan velocity of a resonant vibrating-mirror beam deflector comprising:
   positioning a beam path altering means having an elliptical surface at least along a scanning range into the beam path of a scanning beam, so that the minor axis of the elliptical surface is coaxial with the scanning beam at the midpoint of the scanning range; and
   forming the elliptical surface so as to maximize the linearity between positions of a reflected portion of the scanning beam reflected from said elliptical surface along a focal plane in relationship to time.

16. The method of claim 15, wherein the elliptical surface is formed by considering the following criteria:
   position of the altering means with respect to the mirror, position of the elliptical surface with respect to the mirror, distance between the focal plane and the altering means, the distance between the mirror and the altering means.

17. The method of claim 16, wherein $$A_f = A_i + 2A_x$$

where $A_f$ is the angle between the reflected portion of the scanning beam and a line normal to the major axis of the elliptical surface at a point of incidence of the scanning beam onto the elliptical surface, $A_i$ is the angle between the scanning beam and a line parallel to the minor axis of the elliptical surface at a point of reflection on the elliptical surface, the point of incidence and reflection constituting the same point on the elliptical surface; and $A_x$ is the angle between the line parallel to the minor axis and the line normal to the elliptical surface at the point of incidence of the scanning beam on the elliptical surface.

18. The method of claim 17, wherein the tan $A_f$ is a linear function.

19. The method of claim 16, further comprising the step of positioning an $f\theta$ lens with respect to the reflected portion of the scanning beam to recollimate the reflected portion of the scanning beam after reflection from the elliptical surface.

20. A method for producing a beam path altering means for linearization of scan velocity of a resonant vibrating-mirror beam deflector, a scanning beam including a first reflected beam portion, reflected from the beam deflector, incident onto the beam path altering means and a second reflected beam portion reflected from the beam path altering means, comprising:
specifying required parameters relating to a reflective elliptical surface to maximize linearization of scan velocity of a scanning beam along a focal plane, the parameters including but not limited to major and minor axes dimensions defining the elliptical surface, distance of the elliptical surface from the beam deflector, distance from the major axis of the elliptical surface to the focal plane for the scanning beam, by linearizing the function tan $A_f$ in the equation $$A_f = A_i + 2A_x$$

where $A_f$ is the angle between the second reflected beam portion of the scanning beam and a line normal to the major axis of the elliptical surface at a point of incidence of the first reflected beam portion of the scanning beam onto the elliptical surface, $A_i$ is the angle between the first reflected beam portion of the scanning beam and a line parallel to the minor axis of the elliptical surface at a point of reflection of the second reflected beam portion of the scanning beam on the elliptical surface, the point of incidence and reflection constituting the same point on the elliptical surface; and $A_x$ is the angle between the line parallel to the minor axis and the line normal to the elliptical surface at the point of incidence;
selecting a cylinder of appropriate diameter and slicing the cylinder at an appropriate angle to produce generally the desired elliptical surface; and
machining the elliptical surface to match the desired shape of the elliptical surface.

* * * * *